(12) United States Patent
Blewett et al.

(10) Patent No.: US 6,327,589 B1
(45) Date of Patent: Dec. 4, 2001

(54) METHOD FOR SEARCHING A FILE HAVING A FORMAT UNSUPPORTED BY A SEARCH ENGINE

(75) Inventors: William John Blewett, Redmond; David C. Gerlt, Renton; Eric Hawley, Seattle; Charles G. Moore, Redmond, all of WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 09/105,123

(22) Filed: Jun. 24, 1998

(51) Int. Cl.[7] .................................................. G06F 17/21
(52) U.S. Cl. ........................ 707/5; 707/3; 707/102; 707/513; 707/531; 704/9
(58) Field of Search ..................... 707/3, 5, 102, 707/513, 531; 704/9

(56) References Cited

U.S. PATENT DOCUMENTS

| | | | |
|---|---|---|---|
| 4,992,972 | * 2/1991 | Brooks et al. | 395/338 |
| 5,530,852 | * 6/1996 | Meske, Jr. et al. | 709/206 |
| 5,535,323 | * 7/1996 | Miller et al. | 395/338 |
| 5,694,559 | * 12/1997 | Hobson et al. | 345/336 |
| 5,699,486 | * 12/1997 | Tullis et al. | 704/270 |
| 5,799,268 | * 8/1998 | Boguraev | 704/9 |
| 5,893,916 | * 4/1999 | Dooley | 707/523 |
| 5,953,732 | * 9/1999 | Meske, Jr. et al. | 707/513 |
| 5,963,208 | * 10/1999 | Dolan et al. | 345/357 |
| 5,995,921 | * 11/1999 | Richards et al. | 704/9 |
| 6,005,569 | * 12/1999 | Breggin | 345/338 |

OTHER PUBLICATIONS

Wextech Systems, "Introduction to AnswerWorks," pp. 1–11. Applicants believe that Document AP was published prior to filing date of instant application.

"AnswerWorks Frequently Asked Questions," Copyright© 1997 WexTech Systems, Inc., pp. 1–2.

"AnswerWorks Redefines How Users Get Help," AnswerWorks Press Release, Feb. 8, 1998, pp. 1–3.

Dayhoff, Judith E., *Neural Network Architectures: An Introduction*, Copyright©1990, Van Nostrand Reinhold, New York, pp. 24–27.

Lawrence, Jeannette, *Introduction to Neural Networks: Design, Theory, and Applications*, Copyright ©1988–1993 by California Scientific Software, Nevada City, CA, pp. 188–191.

* cited by examiner

*Primary Examiner*—Jean R. Homere
(74) *Attorney, Agent, or Firm*—John S. Pratt, Esq; Kilpatrick Stockton LLP

(57) ABSTRACT

Searching a file in a format unsupported by a search engine by creating term-topic links with associated probabilities. A file is retrieved comprising a compressed HTML file or a webpage. The file is parsed to retrieve data associated with title tags and body tags. In addition, user queries are received so that the user may associate a query with the title data. Term-topic links are created by linking terms from the retrieved data and the query with a topic. Heuristics are then used to determine the probability associated with each term-topic link. Term-topic links having a term containing nouns are assigned a higher probability than verbs, verbs are assigned a higher probability than adjectives, and adjectives and adverbs are assigned the same probability. The term-topic links are trained by adjusting the assigned probabilities based on a user defined query and an associated target topic.

34 Claims, 4 Drawing Sheets

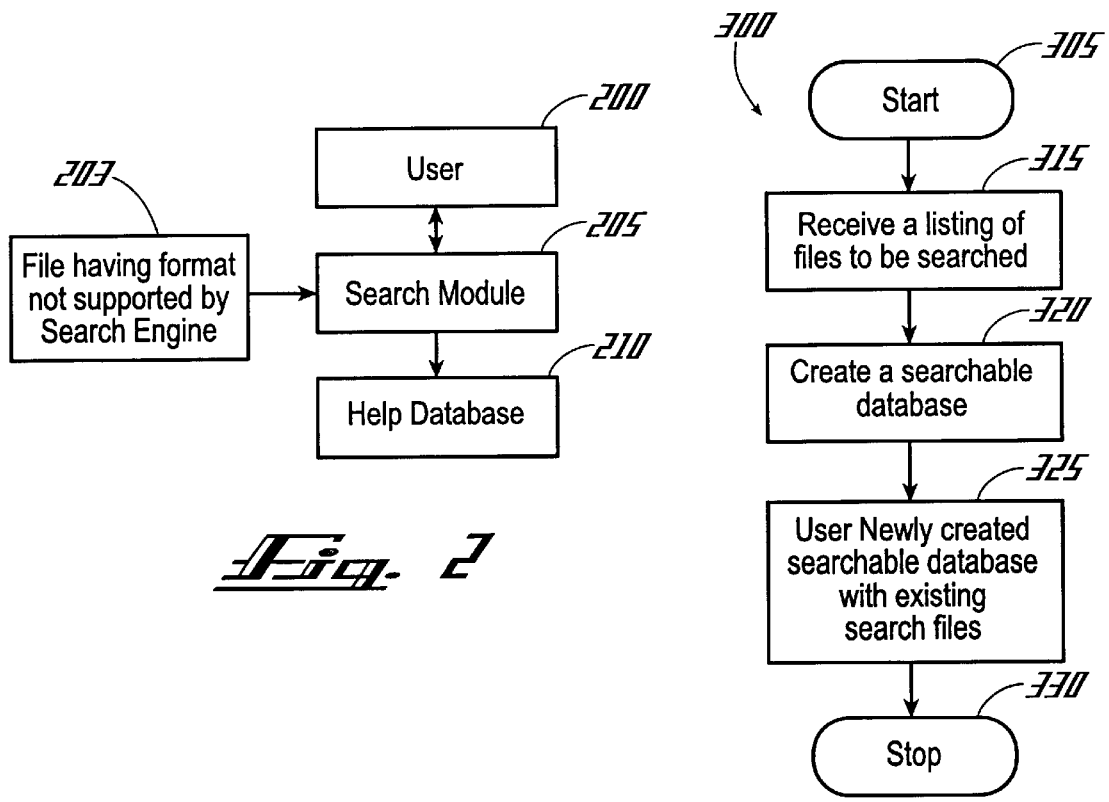
Fig. 2
Fig. 3
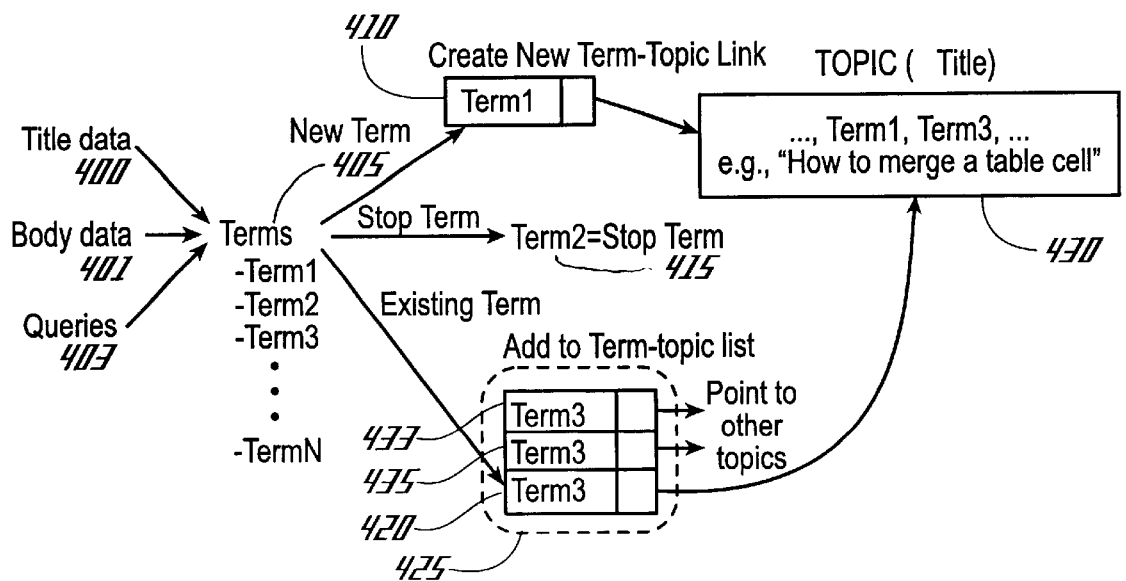
Fig. 4

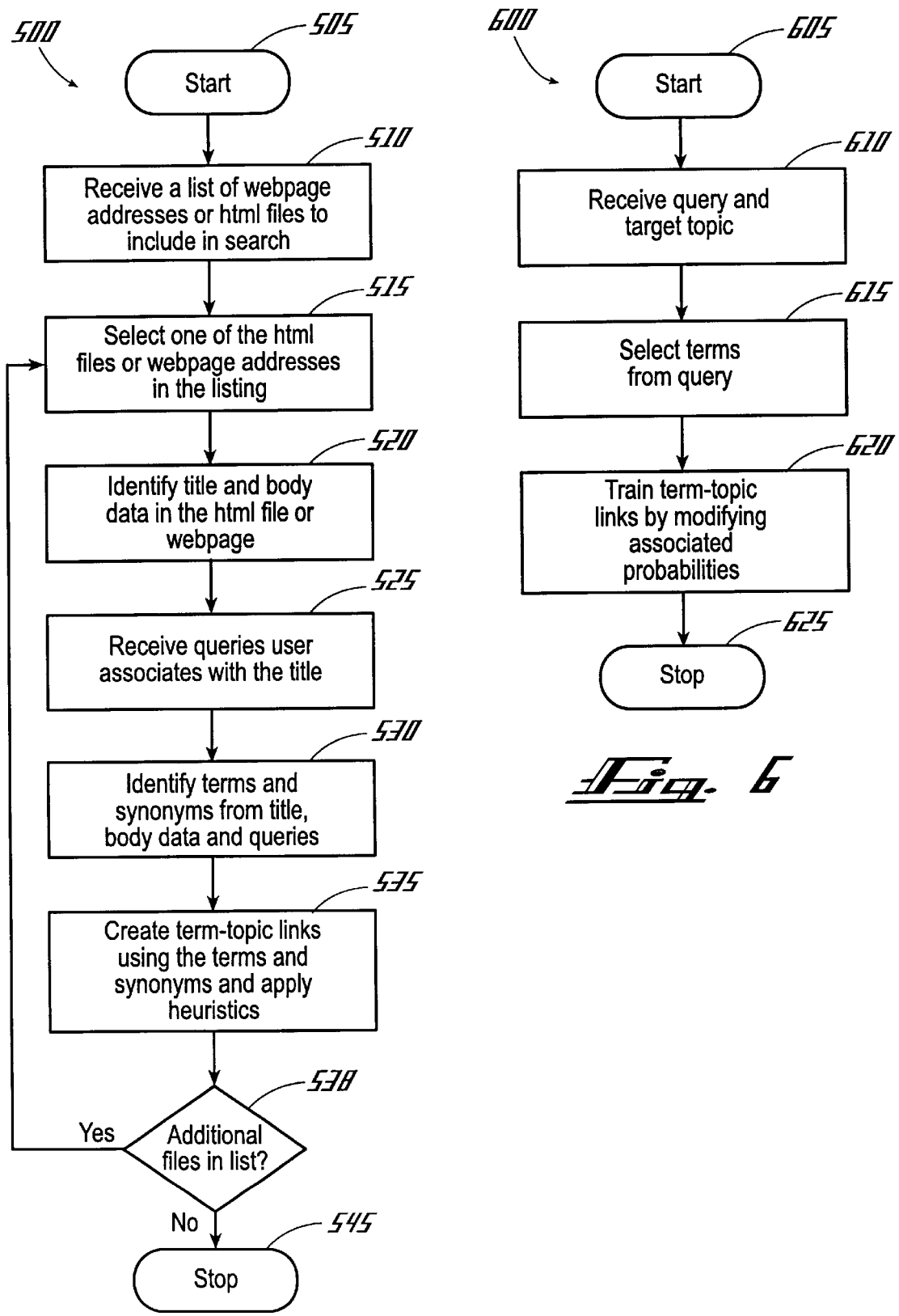

METHOD FOR SEARCHING A FILE HAVING A FORMAT UNSUPPORTED BY A SEARCH ENGINE

FIELD OF INVENTION

The field of the invention relates to searching a file containing for topics and related terms and more particularly, to performing a search on a file having a format unsupported by a search engine and associating user queries to topics contained in the file.

BACKGROUND OF THE INVENTION

Software products often include online help files to assist users in performing tasks within the software. Users have become accustomed to executing these online help routines to assist them in performing tasks with the software. In more complex software environments, multiple help files may be used to provide the user with the requested help. In many cases, a search engine is used to search the help file, or files, and retrieve the relevant topics the user is requesting.

Search engines typically operate by the user first entering a query containing the topic in which the user desires help. The search engine then retrieves the help information related to the topic. Some search engines merely provide a user with a menu of help options, requiring the user to select from the available help options, and then retrieve the related help information based on the selected options. However, other search engines have become much more sophisticated by allowing a user to enter a query in a natural language. A natural language is a language that is structured to match the pattern of speech. For example, "How do I merge table cells?" is a query entered using natural language. These advanced search engines parse the query for important terms located in the query and use these terms to search the help files for related help information. This type of search is typically performed by using an indexing mechanism relating specific terms to the help information provided in the help files.

Even though the size of help files has increased to keep up with the increasing complexity of software and the number of tasks performed using the software, help files may not provide all the required help. Generally, online help files are not all inclusive and may leave out specific tasks. This may occur because the overall software community may only utilize a program function rarely, thereby justifying a software developers decision to leave out information on the function from the help file for performance reasons. This will, however, burden an individual user or office that may utilize the function often and desire to search for help on how to use the function. In addition, help files may not include specialized tasks created especially for the business using a general software product. In this case, the software developer fails to include the specialized task within the help file because he or she is unaware of the task.

Furthermore, as businesses rely more on software, many develop a computer service department to assist the employees with product information, software installation and solutions to software problems. To assist in this area, computer service departments will install "help desks" as a mechanism to assist the employees with their software needs. Often those monitoring the help desk will encounter the same question many times, particularly if that question relates to a task involving the software program that is not explained well in the software manual, in the online help or is related to how the software is used to perform a specialized business function. Help desk administrators will often develop user manuals or distribute special bulletins, either by paper or through a webpage on the business website, providing answers to users most frequently asked questions. In addition, software vendors may provide a "Frequently Asked Questions" bulletin or webpage providing answers to typical user questions. These "typical" user questions may not be anticipated by software developers during the initial development phase and, therefore, may not be included in online help or not readily accessible in the user manuals.

The result of this activity in the software help area is that the user is faced with many places to check in the event a question arises regarding a specific function of the software. In addition, help desk administrators are forced to maintain many sources of help information so that when a user calls in with a question, the help administrator is faced with checking various help bulletins, "Frequently Asked Questions" lists and online help in order to address the users questions.

Unfortunately, it is impossible for software developers to anticipate all the desired help related information to include in a help file during the software development phase. Regardless of the type of search engine used to support the help function, prior search engines typically do not allow a user to include additional information to be efficiently searched outside of what is in the help files. Prior search engines do not allow a user to include specific queries to relate to specific help topics. To address this help source overload by the user, an alternative approach allows the user to add a file as a help file for a software program. However, this approach does not provide for the addition of user queries to associate with specific help topics.

Therefore, there exists a need to search files that do not have a format supported by a search engine. In addition, there exists a need to associate user queries with related help topics contained in a file that is formatted in a manner supported by a search engine.

SUMMARY OF THE INVENTION

The present invention meets the needs described above by providing a method for searching a file having a file format not supported by a search engine. Advantageously, the present invention can search this file in combination with other help files, and associate user queries with related help topics contained in the unsupported file.

Generally described, the present invention initiates the file search by retrieving a list of files from a user. The list of files typically comprises compressed HTML files or paths and their associated addresses to webpages. The compressed HTML file or webpage each contains help titles, which identify the topic of help information, referred to as title data. In addition, the compressed HTML file or webpage each also contains the help information identified by the help title, referred to as body data. Each file is parsed to retrieve the title data and body data. Using the title tags and body tags located within the file, the data associated with the title and body tags is retrieved. The body data is related to its corresponding title data. In addition, user queries can be received so that the user may associate the query with the title data.

Term-topic links can be created by using the retrieved data. Terms are identified from the title data, related body data and user queries, whereas a topic is determined using the title data. The term-topic links are then created by linking the identified terms to the topic. Term-topic lists are generated for those terms that are linked to multiple topics.

Following the creation of the term-topic links, heuristics are used to assign a probability to each of the term-topic links. For one aspect of the present invention, the heuristics define nouns to have a higher probability than verbs, verbs to have a higher probability than adjectives and adjectives and adverbs to have the same probability. In the event it can't be determined whether the term is a noun, verb, adjective or adverb, the term is assigned a probability equal to that of a noun.

After the application of heuristics, the present invention can train the term-topic links based on user-entered queries and associated target topics. This allows the user to indirectly modify the probabilities associated with the term-topic links by requiring a target topic to be retrieved with a high combined probability. Using a query, a list of topics is retrieved based on the terms found in the query. The combined probabilities of all the retrieved topics are determined. If the target topic is not contained within a predefined number of topics having the highest combined probability, then the probabilities are decreased for term-topic links selected from several randomly selected topics having a higher combined probability than the target topic. In addition, the probabilities for term-topic links that are associated with the target topic are increased.

Significantly, the present invention supports the creation of a searchable database using term-topic links from a file unsupported by a search engine. A search can be conducted by searching multiple searchable databases. The present invention also supports and associates user queries with topics in the searchable database created from the unsupported file. This advantage allows the user to associate common queries, not previously contained in the database or associated with a given topic, to a topic creating a more effective search mechanism for that user. The present invention also provides the ability to train the term-topic links to increase the probability that a target topic will be retrieved near the top of a list of retrieved topics. This advantage gives the user the ability to modify what is retrieved by the search engine based on the needs of the user.

These and other advantages and aspects of the present invention may be more clearly understood and appreciated from a review of the following detailed description of the disclosed embodiments and by reference to the appended drawings and claims.

BRIEF DESCRIPTION OF THE DRAWINGS

FIG. 2 depicts the interaction of a search module with a user, a help file, and a help database in an exemplary embodiment of the invention.

FIG. 3 is a flowchart illustrating general steps for creating a searchable database from a file unsupported by a search engine in an exemplary embodiment of the invention.

FIG. 4 is a diagram graphically depicting a process of creating term-topic links from a file unsupported by a search engine in an exemplary embodiment of the invention.

FIG. 5 is a flowchart illustrating detailed steps for creating term-topic links from a file unsupported by a search engine in an exemplary embodiment of the invention.

FIG. 6 is a flowchart illustrating general steps for training term-topic links using query and target topic inputs in an exemplary embodiment of the invention.

DETAILED DESCRIPTION

The present invention is directed toward a method for searching a file having a file format not supported by a search engine. In one embodiment, the invention is incorporated into a suite of applications bundled together and entitled "OFFICE 2000", marketed by Microsoft Corporation of Redmond, Washington. Briefly described, the "OFFICE 2000" application suite allows a user to access multiple applications while providing a consistent user interface between the bundled applications.

To initiate a search operation, the present invention retrieves a list of typically comprising compressed HTML files or paths and their associated addresses to webpages located at a website. Each file is parsed to identify title tags and body tags resulting in the retrieval of data associated with the identified tide tags and body tags. Typically, body data will be related to title data. In addition, user queries can be received so that the user may associate the query with the title data.

Term-topic links can be created by using the retrieved data. A term-topic link associates a term to a topic related to that term. First, terms are identified from the title data and related body data and user queries. Next, a topic is determined using the title data. All terms identified from title data and related body data and user queries are then linked with the topic. Term-topic lists are generated for those terms that are linked to multiple topics. During the creation of the term-topic links, heuristics are used to assign a probability to each of the term-topic links. In one embodiment of the present invention, the heuristics define nouns to have a higher probability than verbs, verbs to have a higher probability than adjectives and adjectives and adverbs to have the same probability.

After applying the heuristics, the present invention can train the term-topic links based on user entered queries and associated target topics. Using a query, a list of topics is retrieved based on the terms found in the query. The combined probabilities of all retrieved topics are determined. If the target topic is not contained within a predefined number of topics having the highest combined probability, then the probabilities are decreased for term-topic links selected from several randomly selected topics having a higher combined probability than the target topic. In addition, the probabilities associated with term topic links that are associated with the target topic are increased.

Exemplary Operating Environment

Figure 1:
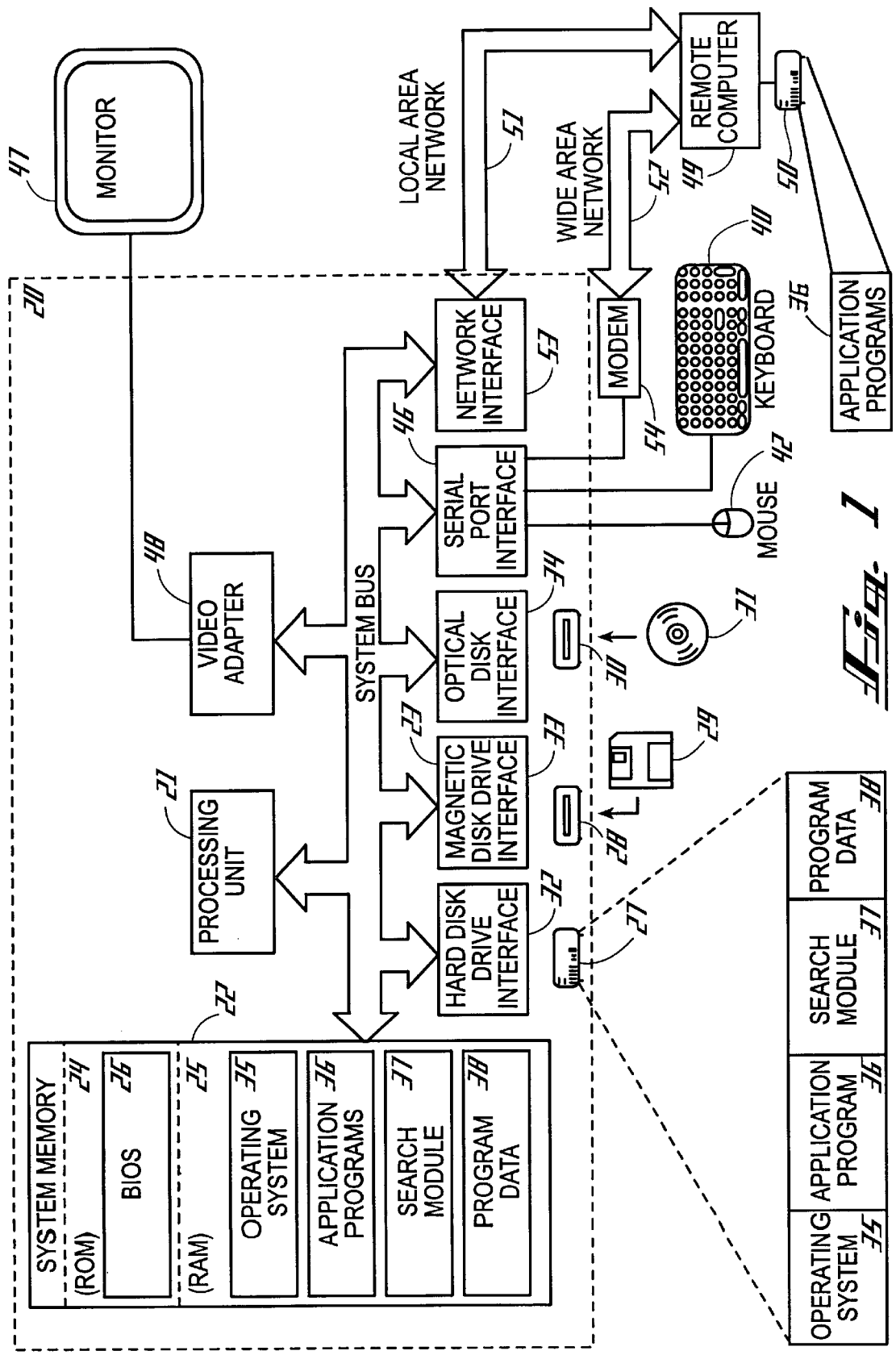
FIG. 1 is a block diagram of a personal computer illustrating the operating environment of an embodiment of the invention.

FIG. 1 and the following discussion are intended to provide a brief, general description of a suitable computing environment in which an exemplary embodiment of the invention may be implemented. While the invention will be described in the general context of an application program that runs on an operating system in conjunction with a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multi-processor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a conventional personal computer 20, including a processing unit 21, a system memory 22, and a system bus 23 that couples the system memory to the processing unit 21. The system memory 22 includes read only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage for the personal computer 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, one or more application programs 36, a search module 37, and program data 38. A user may enter commands and information into the personal computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

FIG. 2 depicts the interaction of a user 200 with a search module 205, the file 203 having a file not supported by a search engine (not shown) and a help database 210 in accordance with an embodiment of the present invention. The user 200 interacts with the search module 205 by initially executing the search module 205. The user 200 is typically a help desk administrator or website administrator who is responsible for maintaining help information. However, the user 200 also could be another application invoking the search module 205 and performing the methods described in the present invention through automation alone.

The user 200 also provides the search module 205 with the name of the file 203 that is not supported by the search engine. In one embodiment of the present invention, the name supplied by the user 200 is the name of a compressed HTML file or the path and its associated address of a webpage located at a website.

The search module 205 receives the name of the unsupported file 203 from the user 200. In the case where the name of the file is the path and its associated address of a webpage, the search module 205 also retrieves the unsupported file by executing an internet browser (not shown) and accessing the webpage using the path and its associated address given the search module 205 by the user 200. To support the operation of the search module 205 queries can be requested from the user 200 for association with topics contained in the unsupported file 203. The search module 205 also can create a help database 210 based on information contained in the unsupported file 203 and queries supplied by the user 200.

In one embodiment of the present invention, the unsupported file 203 will be a compressed HTML file or a webpage located at a website accessible through the internet. Typically, the unsupported file 203 will contain a title describing what type of help is contained in the unsupported file 203 along with information that addresses how to perform the help described in the title. For example, a title in the unsupported file 203 may include "How to merge table cells." Consequently, the unsupported file 203 would also contain information describing how to perform the task of merging table cells. The unsupported file 203 stores this information in a format that is not searchable by the search engine (not shown). The file can not be searched by a search engine because that file provides no indexes or database fields to support the operation of an effective search.

Using the information contained in the unsupported file 203 and user queries, the search module 205 generates a help database 210. The help database comprises the term and topic links. Topics are generated from the titles obtained from the unsupported file 203. Terms, linked to the topics to which they relate, are generated from information contained in the unsupported file 203 and user queries. The term-topic links contained in the help database 210 provide a searchable functionality using the information contained in the unsupported file 203.

FIG. 3 is a flow chart illustrating the high level steps for creating a searchable database from a file having a format not supported by a search engine in an embodiment of the present invention. Method 300 begins at the start step 305 to initiate the search module. This initiation can be performed by a user executing commands to invoke the search module 205 or, as it is should be recognized by one skilled in the art, automatically by another application.

The method 300 proceeds to step 315 where it receives a listing of files to be searched. The listing of files can comprise compressed HTML files as well as webpage paths and their associated addresses located at websites. The listing contained in step 315 can comprise either compressed HTML files alone, or a webpage path and its associated address. After receiving the listing of files to be searched, a searchable database such as the help database 210, is created in step 320. The searchable database is created using the files received from step 315. To create the searchable database in step 320, term-topic links are created using information contained in the list of files received in step 315. A term-topic link is a term, i.e., a word, that is linked to a specific topic. For example, a term "merge" might be linked with the topic "How to merge table cells." In addition, the term "table" and "cell" would also be linked to the topic "How to merge table cells" because those terms are also related to the topic. Terms are generated using the data contained within the files received in step 315 as well as from user queries (not shown).

Having created the searchable database, the method 300 proceeds to step 325 where the newly created searchable database is used with existing search files. By using this newly created searchable database along with the existing search files, the user will be able, with one query, to receive information on topics from many different sources. Help can be received not just from on-line help, from a specific webpage or from a specific file, but received from all files, webpages and on-line help combined. Following step 325, method 300 terminates at step 330.

FIG. 4 is a diagram graphically depicting the process of creating term-topic links from a file having a format not supported by a search engine in an embodiment of the present invention. The unsupported file 203 can contain title data 400 and information related to the title, i.e., body data 401. The title data 400 will, in essence, be the title of the help that is described in the body data 401. Using the example above, the title may be "How to merge table cells." In this example, the body data 401 will include information on how to actually perform the task of merging table cells. In addition to the data contained in the unsupported file 203, queries 403 also can be used to support the creation of term-topics. The queries 403 can include queries that a user or application may use to associate with the help topic that is the subject of the title data 400 and body data 401. To create a searchable file, title data 400, body data 401 and queries 403 can be parsed into their composite terms 405, represented as Term1 through TermN. These terms can be analyzed in order to create a term-topic link. In the case where the term is a new term, a new term-topic link 410 is created. For example, the term-topic link comprises the Term1 and a link to a topic 430. The topic 430 is derived from the title 400 received from the unsupported file 203.

In the event that one of the terms 405 matches a term in an existing term-topic link, then the term is added to that term-topic list with a link to the related topic. For example, Term3 is identified as an existing term and is added to the term-topic list 425 as a new term-topic link 420. The term-topic link 420 includes Term3 with a link to the same topic pointed to by Term1, because Term1 and Term3 are derived from data related to the same topic. For the other term-topic links located in the term-topic list 425, while all the terms are the same, the links will point to other topics. For example, if Term3 referred to the word "merge", the term-topic list 425 will depict a term-topic list for all term-topic links that include the word "merge." Continuing with the example, term-topic link 433 may point to the topic "How to perform mail merge," and term-topic link 435 may point to the topic "How to merge files." Whereas, new term-topic link 420 points to the topic "How to merge table cells." Each of the term-topic links in the list 425 comprises the same terms, such as "merge" in the example, but each of the links in the term-topic list 425 point to a different topic.

In one embodiment of the present invention, the terms are also analyzed to determine if any include stop terms 415. A stop term is a term that has been determined to be of little value in performing a search. For example, the letter "A" or the words "how" or "do" represent stop terms. These are examples of very common words contained in user queries and, therefore, do not provide much value in performing a search. In this embodiment, the terms 405 parsed from the title data 400, body data 401 and queries 203 and 403 are searched. In turn, a determination is made whether any of those terms match a list of stop terms. If any term matches a stop term, then those terms are thrown out and not used to create a term-topic link.

FIG. 5 is a flow chart illustrating detailed steps for creating term-topic links from an unsupported file and user queries in an embodiment of the present invention. A method 500 begins at the start step 505 where the search module is initiated by the user. As stated earlier, it will be recognized by one skilled in the art that this might be executed by an application as well.

Proceeding to step 510, a list of webpage paths and their associated address addresses or compressed HTML files is received to support the help search. Webpage addresses, commonly referred to as URLs, are addresses to websites containing the webpage. To access a webpage, an internet browser application can be used to enter the webpage address or URL and to access information contained in the webpage at a website. HTML files, on the other hand, are files created by using a hypertext markup language. This language is commonly used to present information on a webpage. It would be recognized by those skilled in the art that while this embodiment depicts the use of webpages and HTML files, that a multitude of other file types may be used that define title data and related body data.

Proceeding to step 515, one of the files or webpage paths and their associated addresses in the listing is selected. At step 520, the title data and body data are identified in the file or webpage selected in step 515. In the case where the file is a compressed HTML file, it will be necessary to further include a step of decompressing the compressed HTML file. File decompression techniques are well recognized in the one skilled in the art. HTML files, as well as webpages, include characteristics that define a title tag and a body tag within the HTML file or webpage. Data corresponds to each of the tags. Therefore, a title tag will have tile data associated with it, and a body tag will have body data associated with it; the body data being related to the title data. This embodiment of the present invention searches either the HTML file or a webpage to identify the title and body tags, and retrieves tide data and body data associated with the tide and body tags, respectively.

Proceeding to step 525, the user input queries associated with the title received from step 520. While a relationship between the title and body may exist, there will be instances where a user also may want to input a query related to that title. This can occur when a query exists for a specific title, but the terms that make up the query are not contained within the title. For example, a help desk administrator may receive many of queries in the form of "How do I combine individual units in my word processor?" In this example, the information desired is related to the title "How to merge table cells". Yet, even though there are no terms in common, the help desk administrator will be able to add this query and associate it with the title "How to merge table cells" so that the information related to the user's request is retrieved when queried. For this representative example, the exemplary embodiment can relate the query to the correct tide, and information related to merging table cells can be presented to the user.

Following reception of queries, in step 530, terms are identified from the title and body data as well as the queries. The tide and body data and queries are parsed into individual terms.

These terms are used to develop the term-topic links. In addition, another embodiment of this invention provides for the determination of synonyms of the terms. Therefore, the end result of performing step 530 is that terms and synonyms from tide, body data, and queries are identified.

In another embodiment of the present invention, step 535 would also include a comparison of terms against a predefined list of stop terms. As stated above with reference to FIG. 4, stop terms are terms that are often used in a query, but provide little value in a search. Therefore, by removing the stop terms, overall performance when executing a search is improved.

Proceeding to step 535, term-topic links are created using the terms and synonyms and linking them to related topics. In the case for a new term where there has been no term-topic link already developed, a new term-topic link is developed which contains the term itself, as well as a link to the topic. In the case where a term-topic link has already been created for a specific term, an additional term-topic link is added to that list and contains a link to the topic. At the completion of step 535, all the terms, except for those determined to be stop terms, derived from the title data, body data, and queries, will have links to a related topic. As stated above, the topic is determined by using the title information.

In addition at step 535, heuristics are used to assign probabilities to all of the term-topic links created up to this point. In one embodiment of the present invention, the heuristics are related to the parts of speech of the terms identified in step 530, such as a list of all the terms and their corresponding part of speech. In assigning the probabilities, the terms in the term-topic link are examined, and if the term is a noun, a probability is assigned. If the term is a verb, the term-topic link is assigned a separate probability, and if the term is an adjective or adverb, the term-topic link is assigned yet another probability. In the event that a term can be used as either a verb or a noun, the term-topic link is assigned the highest probability. It is preferable that nouns receive a higher probability than verbs, and verbs receive a higher probability than adjectives, but that adjectives and adverbs receive the same probability.

The method 500 continues to step 538 to determine if another file exists in the listing provided in step 515. In the event that additional files exists, the method 500 proceeds to step 515, and repeats the above steps for the next file in the listing. In the event that there are no more files to select, as determined in step 538, the method 500 continues to step 545.

The method 500 terminates at step 545. At this point, the list of webpages or HTML files is now searchable and can be included with other help files searchable by the user.

FIG. 6 is a flow chart illustrating the high level steps for training term-topic links using query and target topic inputs in an embodiment of the present invention. When using the database created with the method 500 described in FIG. 5, the probabilities associated with the term-topic links are combined in order to determine and retrieve the most relevant topics based on the user's query. However, depending on the assignment of probabilities and the user's query, it is possible that the retrieved topics are not the most relevant to the user. This is possible because the method used by the search engine may not account for individual user's style. Therefore, an exemplary embodiment of the present invention provides a method to train the probabilities associated with the term-topic links. Training allows the user to influence these probabilities so that the topics most relevant to the user are presented higher on a retrieval list and those less relevant topics are presented lower on the retrieval list, or not at all. To train the list of term-topic links, a method 600 begins at the start step 605.

Proceeding to step 610, the user receives a query and a target topic. A query represents what the help desk administrator or user wants to associate with a specific topic, referred to as the target topic. The query is then broken up into terms. Unlike the term analysis in method 500, it is preferable that the only terms identified in the query are those terms that are currently present in the term-topic links. Any terms that are not recognized in step 615 are not used in the method 600.

Proceeding to step 620, the term topic links are then trained by modifying the probabilities associated with the term-topic links such that there is a stronger association between the target topic and the query (i.e., that there is a high probability the target topic is retrieved using the query). The method 600 stops at step 625.

Figure 7:
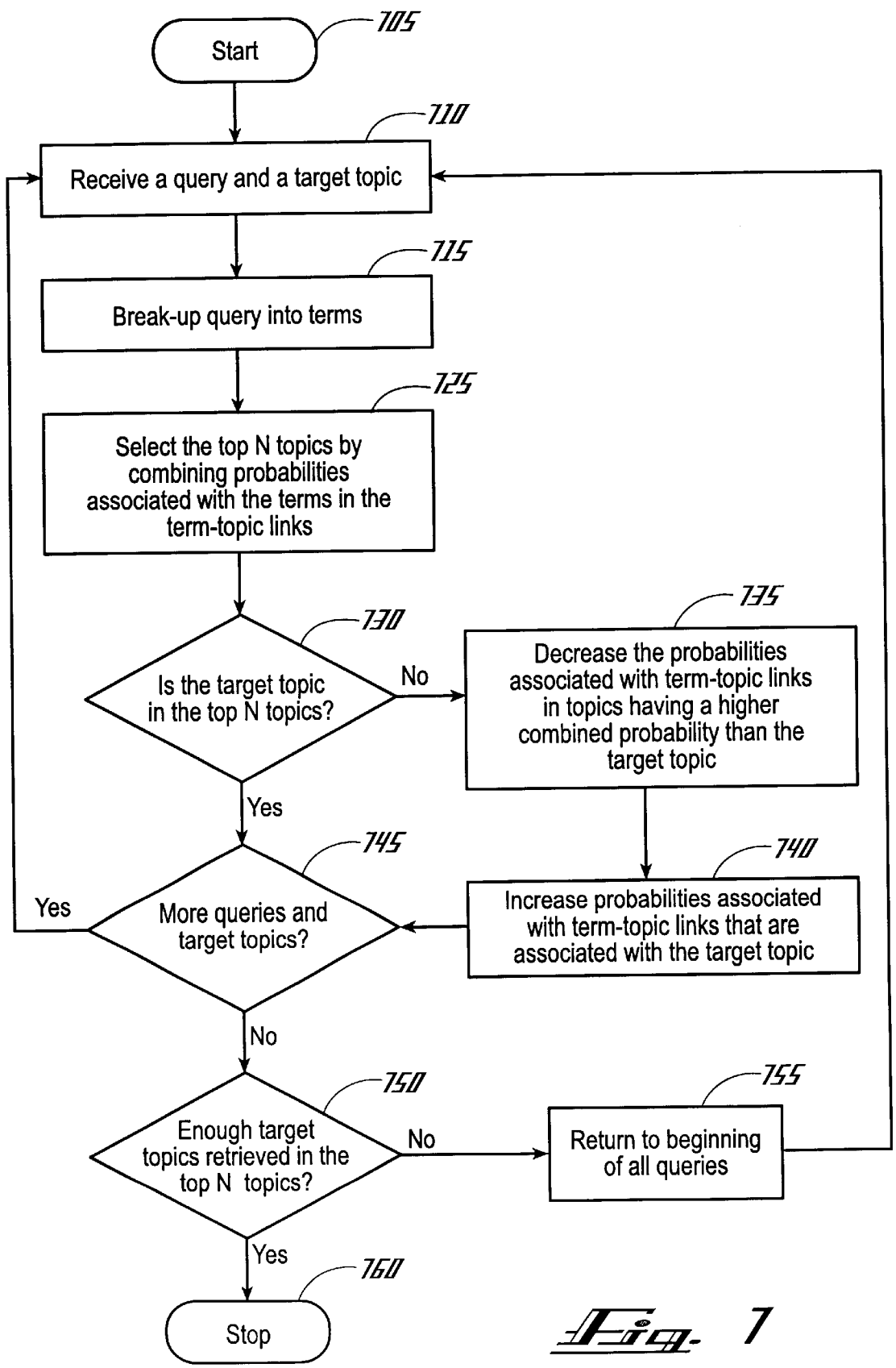
FIG. 7 is a flowchart illustrating detailed steps for training term-topic links using query and target topic inputs in an exemplary embodiment of the invention.

FIG. 7 is a flowchart illustrating detailed steps for training term-topic links using query and target topic inputs in an embodiment of the present invention. The goal of training the term-topic links is to provide a stronger association between a user query and a target topic. Generally, when a user submits a query, the search engine searches the term-topic database and will submit more than one topic that responds to the query. The search engine will provide a list of potential topics attempting to present the related topic the user was trying to retrieve using the query. The list of potential topics is typically provided as a list to the user in an order, determined by a search algorithm, where the topic determined to be the highest probability of addressing the user's query is presented first, and then listing topics in decreasing probability. Depending on the query, however, the topic the user wants to receive help on may be a low probability, as calculated by the search algorithm, and consequently presented very low on the topic list, if at all. Therefore, the goal of training the term-topic links is to provide a stronger association between the user's query and the desired topic so that the desired topic is calculated to have the highest probability or at least close to the highest probability so that it is displayed at or near the top of the topic list.

In one embodiment of the present invention, the user is allowed to enter queries to associate them with a topic (see FIGS. 4 and 5 and method 500). Depending on how the heuristics assign the probability to a specific term-topic link or how the algorithm combines the probabilities to determine which topic is calculated to be most relevant to the user's query, there exists the probability that the user may not receive the topic related to the user's query near the top of the list. Rather, the user may have to scroll down to see the topic related to the user. This additional user function is undesirable because it adds frustration to the user at a time when the user is trying to get help.

A method 700 addresses this issue by providing a method to modify the probabilities associated with the term-topic links to increase the probability that the user will have the desired topic presented at the top or near the top of the list when the user enters a query. The method 700 begins with the start step 705. At this step, the search module is executed and a set of term-topic links have already been developed. These term-topic links may be developed using any method, including the method 500 described in reference to FIG. 5. Furthermore, it should be recognized by one skilled in the art that the training method described in method 700 would also apply to other search algorithms where probabilities are associated with terms and there is a desire to increase the association of a query to a topic.

Proceeding to step 710, the method 700 receives a query and target topic. The query and target topic may be developed by the user or may be a "canned" set of queries and target topics developed by software developers and vendors. The input may be performed by a variety of ways, including inputting the query and target topic in response to a prompt or by including all the queries and target topics in a file thereby allowing the present invention access to the file to read the series of queries and target topics.

After receiving the query and target topic in step 710, the method 700 proceeds to step 715 where the query is broken up into terms. It is preferable that the only terms identified are the terms that already exist in the term-topic database. Terms that match a list of terms contained in a stop term list or those terms that do not match any term existing in the term-topic link database are discarded.

Proceeding to step 720, the present invention then retrieves all the topics related to the terms identified in step 715. A single term may contain several term-topic links. As discussed above, for example, the single term "merge" may contain a term-topic link for "How to merge table cells", "How to mail merge" and "How to merge files" topics. Therefore, in step 720, using this example, the term "merge" would itself result in at least three topics being returned because "merge" is related to the three topics listed.

The method 700 then proceeds to step 725 where the top N topics are selected by combining the probabilities associated with term-topic links that are associated with the retrieved topics. Each retrieved topic will have a multitude of terms associated with it by way of the term-topic link. In addition, each of the term-topic links will have a probability associated with it. These probabilities may be assigned by using the heuristics described in step 540 of method 500. However, it will be recognized by one skilled in the art that the probabilities may be assigned using many different paradigms and is still considered within the scope of this embodiment of the present invention.

It is preferable that the combined probability of a retrieved topic is determined by first identifying all the terms associated with the query that match terms within the retrieved topic. For all the matching terms in the retrieved topic, the corresponding tern-topic links are identified and the associated probabilities of those term-topic links are multiplied together. In the event there are terms contained in the query that do not match terms in the topic, it is preferable that a very low probability number be multiplied into the combined probability for as many times as there are unmatched terms.

An example of step 725 includes the case where the combined probability is being computed for the retrieved topic "How to merge files" using the query "How do I merge table cells?" First, the words "How", "do" and "I" are not utilized because they are Stop terms and therefore they will not be contained in the term-topic link database (see step 715 above). Therefore, the query comprises the terms "merge", "table" and "cells". In determining the probability of the topic "How to merge files," the probability associated the term-topic link for "merge" is used. Because there are no other matching terms between the query an the retrieved topic, no other term-topic link associated probabilities are combined. However, the query contains two additional terms that are not included in the retrieved topic (i.e., "table" and "cells"). Therefore, it is preferable to multiply a very low probability number to the "merge" term-topic link probability to create a combined probability. Because two terms are not matched, this very low probability number should be multiplied in the "merge" probability twice.

After determining the combined probabilities of all the retrieved topics, a predefined number of topics, represented by N, having the highest combined probability are retrieved. It is preferable that the value of N equal 5; however, this is a design choice and it will be recognized that any value of N may be used and considered within the scope of the present invention.

Following the selection of the top N topic probabilities in step 725, the method 700 proceeds to step 730 and performs a comparison to determine if the target topic received with the query in step 710 matches any of the retrieved top N topics.

If the target topic is not within the top N topics, it signifies that the query and the target topic do not have a strong enough association. The combined probability of the target topic should be high enough to warrant retrieval of the target topic within the top N topics using the given query. This is the reason the query and the target topic are inputted together in step 710, because they represent a strong association.

In the event that the target topic is not within the top N topics, processing continues to step 735, where the probabilities of some topics, having a combined probability higher than the target topic, are reduced. This is preferably performed by randomly selecting a topic having a higher combined probability than the target topic. Then, one term-topic link associated with the random topic is selected and the associated probability of the term-topic link is decreased. Next, another randomly selected topic having a higher combined probability than the target topic is selected and the process continued. It is preferable that the number of probabilities that are decreased equal the number of terms contained in the query.

After decreasing the associated probabilities in step 735, the method 700 proceeds to step 740, where the combined probability associated with the target topic is increased. This is preferably performed by identifying all the term-topic links associated with the terms contained in the target topic and increasing all the probabilities associated with each of the term-topic links. This will effectively raise the combined probability associated with the target topic. Following step 740 the method 700 proceeds to step 745.

It is preferable that the aggregate amount that probabilities associated with the term-topic links are decreased in step 735 is equal to the aggregate amount that probabilities associated with the term-topic links are increased. This will effectively keep the average of the probabilities associated will all the term-topic links the same.

In the event that the target topic is within the top N topics in step 730, then the method 700 proceeds to step 745. In this case where the target topic is within the top N topics, the combined probability associated with the target topic is high enough to suggest the desired strong association between the query and the target topic.

At step 745, a comparison is conducted to determine if any more query and target topic inputs exist. This comparison can be performed by determining if the end of file marker has been reached in the case where the query and target topics are being inputted via a file. When the query and target topic input are by user entry, the user may signify the end of input. End of input markers are well known in the art and it will be recognized that they may be implemented in many different ways.

In the event more queries exist, from the comparison performed in step 745, the method 700 proceeds back to step 710, where it receives another query and target topic.

In the event no more queries exist, the method 700 proceeds to step 750, where the number of target topics retrieved in the top N topics is compared with a predefined threshold. This comparison is performed by keeping a count of all the times the target topic is retrieved in the top N topics, so that it can be known whether the probabilities have been "trained" enough. In other words, additional modification of the probabilities may be necessary if the count does not meet the predefined threshold. The value of the predefined threshold is dependent on how strong of an association is desired between the query and the target topic. The higher the threshold, the stronger the association (i.e., the higher the probability that the target topic will have the highest combined probability for when the query is used in a search).

If there were not enough target topics retrieved in the top N topics in step 750, then method 700 proceeds to step 755 where the process returns to the beginning of all entered queries and target topics, and steps 710–745 are repeated. This may be performed by returning to the beginning of the file containing the queries and target topics. In the case where the user is entering the query and target topics, this may be performed by saving the queries and target topics the user entered so that the user is not required to re-enter them. The process of reusing input data is well known in the art and the various methods used are considered within the scope of the present invention.

If enough target topics are retrieved in the top N topics in step 750, then the method 700 terminates in step 760.

In summary, the present invention is directed towards searching a file in a format unsupported by a search engine. In one embodiment, a list of files is retrieved from the user. The list of files contain either compressed HTML files or paths and their associated addresses to webpages located at a website. Each file or webpage received is parsed to retrieve data associated with title tags and body tags. In addition, user queries are received so that the user may associate a query with the title data.

Term-topic links are created using the retrieved data. Terms identified from the title data, body data and user queries are linked with topics determined from the title data. Term-topic lists are generated for those terms that are linked to multiple topics.

Heuristics are then used to assign a probability to each of the term-topic links. In one embodiment of the present invention, the heuristics define nouns to have a higher probability than verbs, verbs to have a higher probability than adjectives and adjectives and adverbs to have the same probability.

After the application of heuristics, the term-topic links are trained. Using a query, a list of topics is retrieved based on the terms found in the query. The combined probabilities of all the retrieved topics are determined. If the target topic is not contained within a predefined number of topics having the highest combined probability, then the probabilities are decreased for term-topic links selected from several randomly selected topics having a higher combined probability than the target topic. In addition, the probabilities associated with term-topic links that are associated with the target topic are increased.

The present invention has been described in relation to particular embodiments which are intended in all respects to be illustrative rather than restrictive. Alternative embodiments will become apparent to those skilled in the art to which the present invention pertains without departing from its spirit and scope. Accordingly, the scope of the present invention is defined by the appended claims rather than the foregoing description.

What is claimed is:

1. A method of searching a file by using terms in the file to find related topics in the file, comprising the steps of:
   (a) receiving the file to be searched;
   (b) parsing the file into selected ones of the terms related to a certain one of the topics;
   (c) creating term-topic links for the selected terms, wherein each term-topic link associates one of the selected terms to the certain topic; and
   (d) if a selected term matches a term in an existing term-topic link,
      creating a term-topic list by associating the matching term and related terms with a term-topic link, wherein each term-topic list is related to a term-topic link.

2. The method of claim 1, further comprising the step of repeating steps (b) and (c) for each remaining one of the topics.

3. The method of claim 1, further comprising the steps of:
   identifying synonyms for each selected term; and
   creating term-topic links for each of the identified synonyms by associating each identified synonym with the certain topic.

4. The method of claim 1, wherein the file is a compressed HTML file and prior to performing the step (b), further comprising the step of decompressing the compressed HTML file.

5. The method of claim 1, wherein the file is a path with an associated address of a webpage, and the step of parsing the file comprises the steps of:
   retrieving the webpage; and
   parsing the webpage into selected ones of the terms related to the certain topic.

6. The method of claim 1, further comprising the step of assigning a probability to each term-topic link.

7. The method of claim 6, wherein the step of assigning the probability is performed by speech heuristics on the term in each term-topic link.

8. The method of claim 7, wherein the step of assigning the probability by speech heuristics comprises the steps of:
   assigning nouns a higher probability than verbs;
   assigning verbs a higher probability then adjectives; and
   assigning adjectives and adverbs the same probability.

9. The method of claim 1, prior to performing the step of creating term-topic links, further comprising the steps of:
   identifying stop-terms, wherein stop-terms comprise a predefined set of common words; and
   removing the identified stop-terms from the selected terms.

10. The method of claim 1, wherein the file is a query.

11. A method of searching a file, comprising the steps of:
receiving the file to be searched;
identifying title tags and body tags contained in the file;
identifying terms contained in data associated with the title tags and in data associated with the body tags, wherein the data associated with the title tag is called a topic of the file;
creating term-topic links by associating each identified term with the topic, wherein each identified term is related to the topics and
if a term matches a term in an existing term-topic link, creating a term-topic list by associating the matching term and related terms with a term-topic link, wherein each term-topic list is related to a term-topic link.

12. The method of claim 11, wherein the file is a compressed HTML file and prior to performing the step of identifying the title tags and body tags, further comprising the step of decompressing the compressed HTML file.

13. The method of claim 11, wherein the file is an paths and its associated address of a webpage, and the step of identifying title tags and body tags in the file comprises the steps of:
retrieving the webpage; and
identifying title tags and body tags contained in the webpage.

14. The method of claim 11, further comprising the steps of:
identifying synonyms for each identified term; and
creating term-topic links for each of the identified synonyms by associating each identified synonym with the certain topic.

15. The method of claim 11, further comprising the step of assigning a probability to each term-topic link.

16. The method of claim 15, wherein the step of assigning the probability is performed by speech heuristics on the term in each term-topic link.

17. The method of claim 16, wherein the step of assigning the probability by speech heuristics comprises the steps of:
assigning nouns a higher probability than verbs;
assigning verbs a higher probability then adjectives; and
assigning adjectives and adverbs the same probability.

18. The method of claim 11, prior to performing the step of creating term-topic links, further comprising the steps of:
identifying stop-terms, wherein stop-terms comprise a predefined set of common words; and
and removing the identified stop-terms from the identified terms.

19. The method of claim 11, further comprising the steps of:
receiving a query;
identifying terms contained in the query; and
creating term-topic links by associating each identified term of the query with the certain topic, wherein the identified terms of the query are related to the topics.

20. A computer readable medium having computer-executable instructions for performing the steps recited in claim 11.

21. A method of searching a help file, comprising the steps of:
receiving the help file containing help information to be searched;
identifying title tags and body tags contained in the help file;
identifying a certain one of a plurality of topics of the help file comprising data associated with the title tag;
receiving a first query;
identifying terms of the help file contained in the certain topic, in data associated with the body tag and in the query;
creating term-topic links by associating each identified term with the certain topic, wherein the identified terms are related to the certain topic;
associating a probability to each term-topic link;
receiving a second query and a target topic; and
training the term-topic links by adjusting the probability of term-topic links to reflect an association between the second query and the target topic.

22. The method of claim 21, wherein the help file is a compressed file and prior to performing the step of identifying the title tags and the body tags, further comprising the step of decompressing the help file.

23. The method of claim 21, wherein the help file is a path and its associated address of a webpage containing help information and wherein the step of identifying title tags and body tags in the help file comprises the steps of:
retrieving the webpage using a browser; and
identifying title tags and body tags contained in the webpage.

24. The method of claim 21, prior to performing the step of training the term-topic links, further comprising the steps of:
identifying synonyms for each identified term; and
creating term-topic links for each of the identified synonyms by associating each identified synonym with the certain topic.

25. The method of claim 21, further comprising the step of assigning a probability to each term-topic link.

26. The method of claim 25, wherein the step of assigning the probability is performed by speech heuristics on the term in each term-topic link.

27. The method of claim 26, wherein the step of assigning the probability by speech heuristics comprises the steps of:
assigning nouns a higher probability than verbs;
assigning verbs a higher probability then adjectives; and
assigning adjectives and adverbs the same probability.

28. The method of claim 21, prior to performing the step of creating term-topic links, further comprising the steps of:
identifying stop-terms, wherein stop-terms comprise a predefined set of common words; and
removing the identified stop-terms from the selected terms.

29. A method of training term-topic links by refining the probabilities of term-topic links to reflect an association between a given query and a target topic, comprising the steps of:
receiving the query and the target topic, wherein the target topic is related to the query;
identifying a first selected ones of terms contained in the query;
retrieving topics linked to each one of the first selected terms in the term-topic links, wherein the target topic will match one of the retrieved topics;
for each retrieved topic, assigning a combined probability to each retrieved topic by combining the probabilities associated with each one of a second selected ones of terms contained in the retrieved topic;
identifying a predefined number of retrieved topics based on the sorted combined probabilities; and in the event the target topic is not above a predefined threshold of retrieved topics, decreasing the combined probability of one of the retrieved topics having a higher combined probability than the target topic and increasing the combined probability of the target topic.

30. The method of claim 29, wherein the step of increasing the combined probability of the target topic and decreasing the combined probability of a one of the retrieved topics, comprises the steps of:

decreasing the probability associated with a term contained in one of the retrieved topics having a higher combined probability than the target topic;

retrieving the terms associated with the target topic by using the term-topic links; and increasing the associated probabilities of each retrieved term.

31. The method of claim 29, wherein the step of decreasing the probability associated with a term contained in a randomly selected retrieved topic is performed the number of times equal to the number of terms identified in the target topic.

32. A computer readable medium having computer-executable instructions for performing the steps recited in claim 29.

33. A method of searching a file by using terms in the file to find related topics in the file, comprising the steps of:

(a) receiving the file to be searched;

(b) parsing the file into selected ones of the terms related to a certain one of the topics;

(c) creating term-topic links for the selected terms, wherein each term-topic link associates one of the selected terms to the certain topic; and (d) assigning a probability to each of the term-topic links by performing speech heuristics on the term in each term-topic link, wherein the step of assigning the probability by speech heuristics comprises the steps of:
assigning nouns a higher probability than verbs,
assigning verbs a higher probability then adjectives, and
assigning adjectives and adverbs the same probability.

34. A method of searching a file, comprising the steps of:

receiving the file to be searched;

identifying title tags and body tags contained in the file;

identifying terms contained in data associated with the title tags and in data associated with the body tags, wherein the data associated with the title tag is called a topic of the file;

creating term-topic links by associating each identified term with the topic, wherein each identified term is related to the topics;and assigning a probability to each of the term-topic links by performing speech heuristics on the term in each term-topic link, wherein the step of assigning the probability by speech heuristics comprises the steps of:
assigning nouns a higher probability than verbs,
assigning verbs a higher probability then adjectives, and
assigning adjectives and adverbs the same probability.

* * * * *